(12) United States Patent
Rose

(10) Patent No.: US 9,630,481 B2
(45) Date of Patent: Apr. 25, 2017

(54) WINDOW VISOR

(71) Applicant: Lund, Inc., Buford, GA (US)

(72) Inventor: Brent Lorenz Rose, Jefferson, GA (US)

(73) Assignee: LUND, INC., Buford, GA (US)

( * ) Notice: Subject to any disclaimer, the term of this patent is extended or adjusted under 35 U.S.C. 154(b) by 48 days.

(21) Appl. No.: 14/846,559

(22) Filed: Sep. 4, 2015

(65) Prior Publication Data

US 2016/0355079 A1    Dec. 8, 2016

Related U.S. Application Data

(60) Provisional application No. 62/171,760, filed on Jun. 5, 2015.

(51) Int. Cl.
| | | |
|---|---|---|
| *B60J 10/70* | (2016.01) | |
| *B60H 1/26* | (2006.01) | |
| *B60J 1/20* | (2006.01) | |

(52) U.S. Cl.
CPC .............. *B60J 10/70* (2016.02); *B60H 1/267* (2013.01); *B60J 1/2002* (2013.01)

(58) Field of Classification Search
CPC .......... B60J 10/70; B60J 1/2002; B60H 1/267
USPC ........................ 296/152, 154, 97.1
See application file for complete search history.

(56) References Cited

U.S. PATENT DOCUMENTS

| | | | | |
|---|---|---|---|---|
| 1,588,654 A * | 6/1926 | Brownlee | .............. | B60H 1/267 454/133 |
| 1,825,192 A * | 9/1931 | Mace | ..................... | B60H 1/267 454/133 |
| 2,106,418 A * | 1/1938 | Wagner | .................. | B60H 1/267 454/133 |
| 2,749,830 A * | 6/1956 | George | .................. | B60H 1/267 454/133 |
| 2,859,680 A * | 11/1958 | O'Shei | ........................ | B60J 1/20 454/133 |
| 2,949,842 A * | 8/1960 | Crandall | ................ | B60H 1/267 454/133 |
| 3,434,408 A * | 3/1969 | Rivers | .................... | B60H 1/267 454/132 |
| 3,866,524 A | 2/1975 | Forbes, Jr. | | |
| 4,527,466 A | 7/1985 | Kossor et al. | | |
| 4,685,718 A | 8/1987 | Steenblik et al. | | |
| 4,756,242 A * | 7/1988 | Keith | ..................... | B60H 1/267 296/152 |
| 4,923,241 A | 5/1990 | Miller | | |
| D326,636 S | 6/1992 | Barth | | |
| 5,460,425 A | 10/1995 | Stephens | | |
| 5,676,418 A | 10/1997 | Strefling | | |
| 5,797,645 A | 8/1998 | Schenk et al. | | |
| D404,698 S | 1/1999 | Schenk et al. | | |
| 6,019,414 A | 2/2000 | Pourciau, Sr. | | |
| 6,736,353 B1 * | 5/2004 | Erben | ................... | B64C 1/1453 244/119 |
| 7,172,240 B1 * | 2/2007 | Kaufman | ............... | B60J 1/2002 296/152 |

(Continued)

*Primary Examiner* — Pinel Romain

(74) *Attorney, Agent, or Firm* — Knobbe Martens Olson and Bear LLP

(57) ABSTRACT

Embodiments of a window visor which can be attached to a vehicle to at least partially cover a window of the vehicle. In some embodiments, the window visor can contain a series of grooves on its outer surface which can direct droplets of water so that they do not collect on the window.

19 Claims, 11 Drawing Sheets

(56) References Cited

U.S. PATENT DOCUMENTS

| | | | |
|---|---|---|---|
| 7,204,543 B2 * | 4/2007 | Mishimagi | B60J 1/20 296/152 |
| D546,935 S * | 7/2007 | Arrowood | D23/393 |
| D556,657 S | 12/2007 | Elwell et al. | |
| 7,762,876 B2 * | 7/2010 | McClary | B60H 1/267 296/152 |
| 8,147,300 B2 * | 4/2012 | Lunghofer | B60J 1/20 454/128 |
| 8,360,500 B2 | 1/2013 | Mishimagi | |
| 8,998,290 B2 * | 4/2015 | Serentill | B60J 1/2002 296/152 |

* cited by examiner

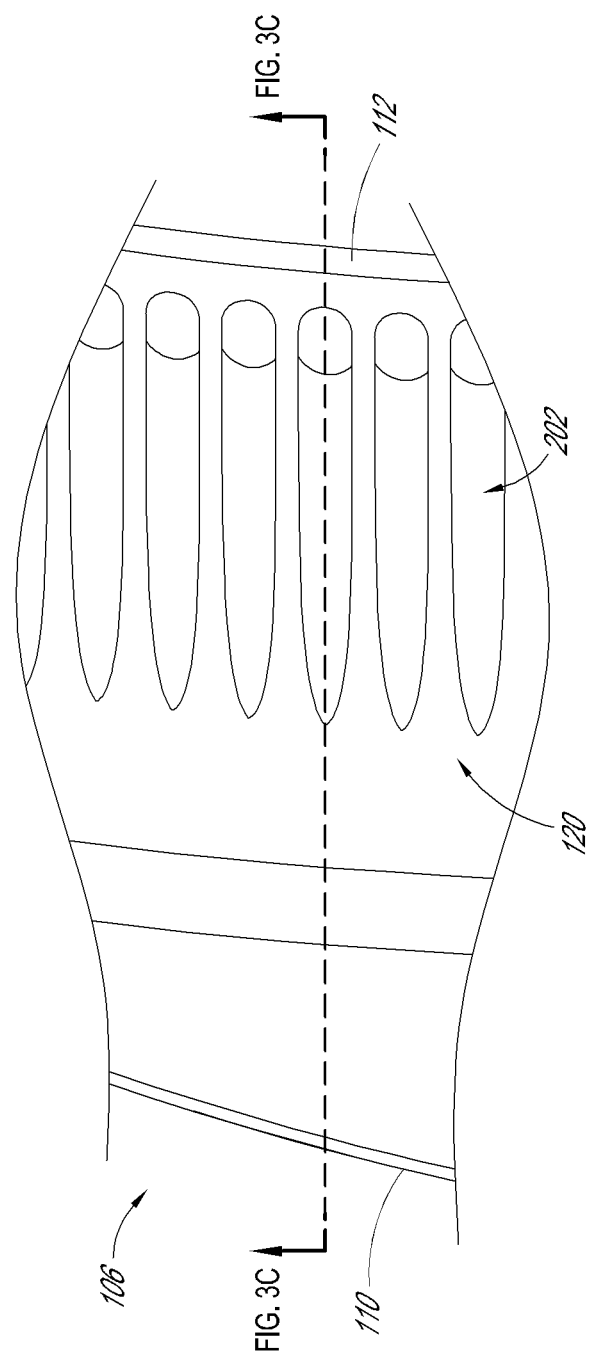

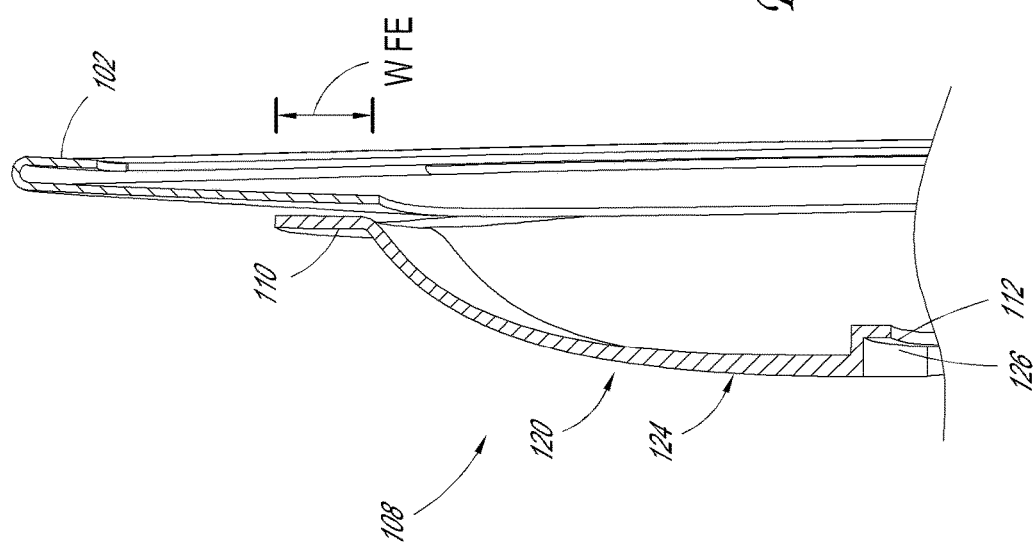

— 1 —
WINDOW VISOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

Disclosed herein are embodiments of a window visor for reducing water buildup on the window of a vehicle.

SUMMARY

Disclosed herein are embodiments of a visor for a window of a vehicle, the visor comprising a front lip configured to be in contact the vehicle, the front lip, a back lip configured to be spaced from the vehicle, the back lip being connected to the front lip, and a body portion positioned at least partially between the front lip and the back lip, the body portion having a front leg and top leg, the body comprising a plurality of longitudinal grooves extending between the front lip and the back lip, and a return surface between the body and the back lip.

In some embodiments, the front lip can have an adhesive strip configured to connect the front lip to the vehicle. In some embodiments, the visor can have generally an L-shape. In some embodiments, there can be no grooves on the top leg. In some embodiments, the visor may not affect the movement of the window. In some embodiments, the plurality of horizontally extending grooves can increase in depth from the front lip to the back lip. In some embodiments, the plurality of horizontally extending grooves can vary in length.

Also disclosed herein are embodiments of a visor system for a window of a vehicle, the visor system comprising a first and second window visor, the first and second window visor being mirror images of one another, each of the first and second window visors comprising a front lip configured to be in contact the vehicle, a back lip configured to be spaced away from the vehicle, the back lip being connected to the front lip, and a body portion positioned at least partially between the front lip and the back lip, the body portion having a front leg and top leg, the body comprising a plurality of longitudinal grooves extending between the front lip and the back lip, and a return surface between the body and the back lip.

In some embodiments, the front lip of each window visor can have an adhesive strip configured to connect the front lip to the vehicle. In some embodiments, each of the window visors can have generally an L-shape. In some embodiments, there may be no grooves on the top leg of each of the window visors. In some embodiments, the plurality of horizontally extending grooves can increase in depth from the front lip to the back lip of each of the window visors. In some embodiments, the plurality of horizontally extending grooves can vary in length for each of the window visors.

Also disclosed herein are embodiments of a window visor for use on a vehicle, the visor comprising a body having a first and second leg, the body surrounded by a perimeter lip, wherein the body curves outwards so that the lip and body lay on different planes, each plane located a different distance from the vehicle, a plurality of longitudinal grooves on a surface of one of the legs, and a return surface behind the plurality of horizontally extending grooves leading to the back lip.

In some embodiments, the perimeter lip can have an adhesive strip along at least a portion of the perimeter lip and, the adhesive strip configured to connect the front lip to the vehicle. In some embodiments, the window visor can have generally an L-shape. In some embodiments, there may be no grooves one of the legs. In some embodiments, the plurality of horizontally extending grooves can increase in depth from the front lip to the back lip. In some embodiments, the plurality of horizontally extending grooves can vary in length.

BRIEF DESCRIPTION OF THE DRAWINGS

FIG. 3B illustrates a top-down view of a front leg of an embodiment of a window visor.

FIG. 3D illustrates a cross-section view of a top leg of an embodiment of a window visor.

DETAILED DESCRIPTION

Disclosed herein are embodiments of a window visor that can be attached to a vehicle in order to at least partially cover the window of the vehicle. Embodiments of the window visor can be used in many different types of vehicles, such as cars, trucks, vans, or airplanes, to name a few. The window visor can reduce the buildup of water, such as rain droplets or mist, onto the window of a vehicle and thus can improve overall visibility through the window by a user. Accordingly, installation of embodiments of the window visor onto vehicles can improve vehicle safety.

Embodiments of the disclosed window visor can have a particular configuration that can consolidate liquid that is moving across a vehicle and direct it so that it reduces the amount of liquid that ends up consolidating on the window of a vehicle. For example, the window visor can direct the liquid outwards away from the vehicle or below the window itself. The liquid can include, for example, rainwater, groundwater, mist, and mud, though the particular liquid does not limit the disclosure.

Figure 1:
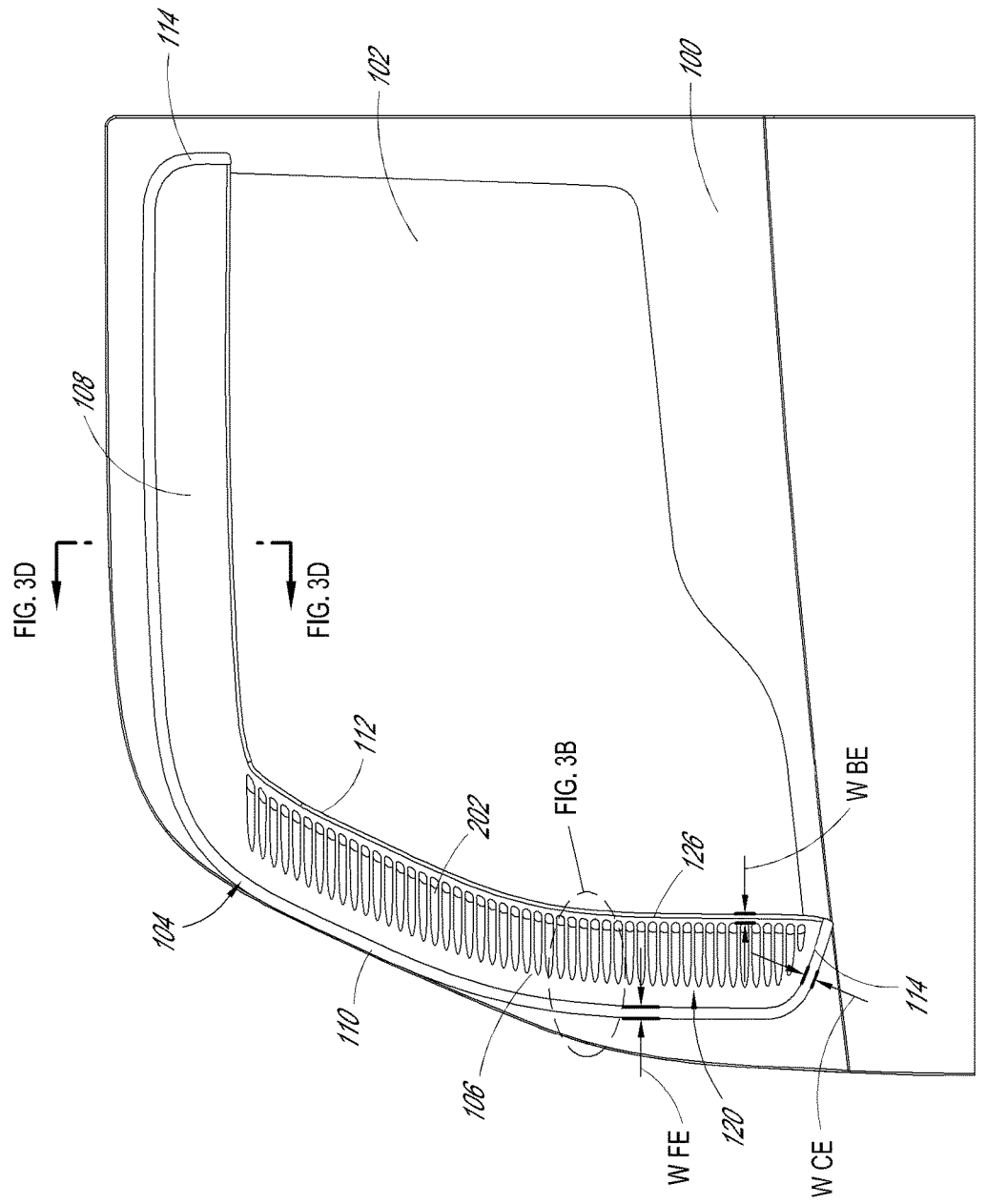
FIG. 1 illustrates a front view of an embodiment of a window visor on a vehicle door.

FIG. 1 illustrates a vehicle door 100 having a window 102. An embodiment of a window visor 104 can be installed to at least partially cover an area of the window 102 and the vehicle door 100. In some embodiments, the window visor 104 can cover about 1%, 5%, 10%, 15%, or 25% of the window 102. In some embodiments, the window visor 104 can cover less than about 1%, 5%, 10%, 15%, or 25% of the window 102. In some embodiments, the window visor 104 can cover greater than about 1%, 5%, 10%, 15%, or 25% of the window 102.

The window visor 104 attached to the vehicle door 100 can advantageously prevent the formation of mist and/or other liquid droplets on the surface of the window 102, as discussed in detail below. The window visor 104 can be used with the window 102 closed, partially opened, or fully opened, and the particular positioning of the window does not limit the disclosure. Further, the window visor 104 desirably does not interfere, or minimally interfere, with any motion of the window 102 or the door 100.

In some embodiments, as shown in FIG. 1, the window visor 104 can be installed generally in the upper and front gap of the window 104 (e.g., in front of the vehicle A-pillar). Therefore, the window visor 104 can be configured to fully cover an opening in the window 102 when the window 102 is partially opened. This position can be used instead of a back of the window 104 configuration (e.g., behind the vehicle A-pillar). As shown, the window visor 104 ends can be located below the bottommost portion of the window 104 and above the topmost portion of the window 104. In some embodiments, the window visor 104 may not extend below the bottommost portion of the window 104.

In some embodiments, as shown in FIG. 1, the window visor 104 can have a generally L-shape with a front leg 106 and a top leg 108. In some embodiments, the window visor 104 can be partially bent, such as the front leg 106 of FIG. 1, or can be generally straight, such as the top leg 108. This can allow for the window visor 104 to conform to the shape of the window. However, different general shapes can be used for different windows. For example, the front leg 106 may be straight, e.g., generally following a central axis and the top leg 108 may be bent, e.g., at least one portion following one axis and at least another portion following a different axis, or vice-versa.

In some embodiments, the front leg 106 may have a width of about 1, 2, 3, 4, 5, or 6 inches. In some embodiments, the front leg 106 may have a width of greater than about 1, 2, 3, 4, 5, or 6 inches. In some embodiments, the front leg 106 may have a width of less than about 1, 2, 3, 4, 5, or 6 inches. In some embodiments, the top leg 108 may have a width of about 1, 2, 3, 4, 5, or 6 inches. In some embodiments, the top leg 108 may have a width of greater than about 1, 2, 3, 4, 5, or 6 inches. In some embodiments, the top leg 108 may have a width of less than about 1, 2, 3, 4, 5, or 6 inches. In some embodiments, the top leg 108 may have the same width as the front leg 106. In some embodiments, the top leg 108 may have a different width as the front leg 106.

Figure 2:
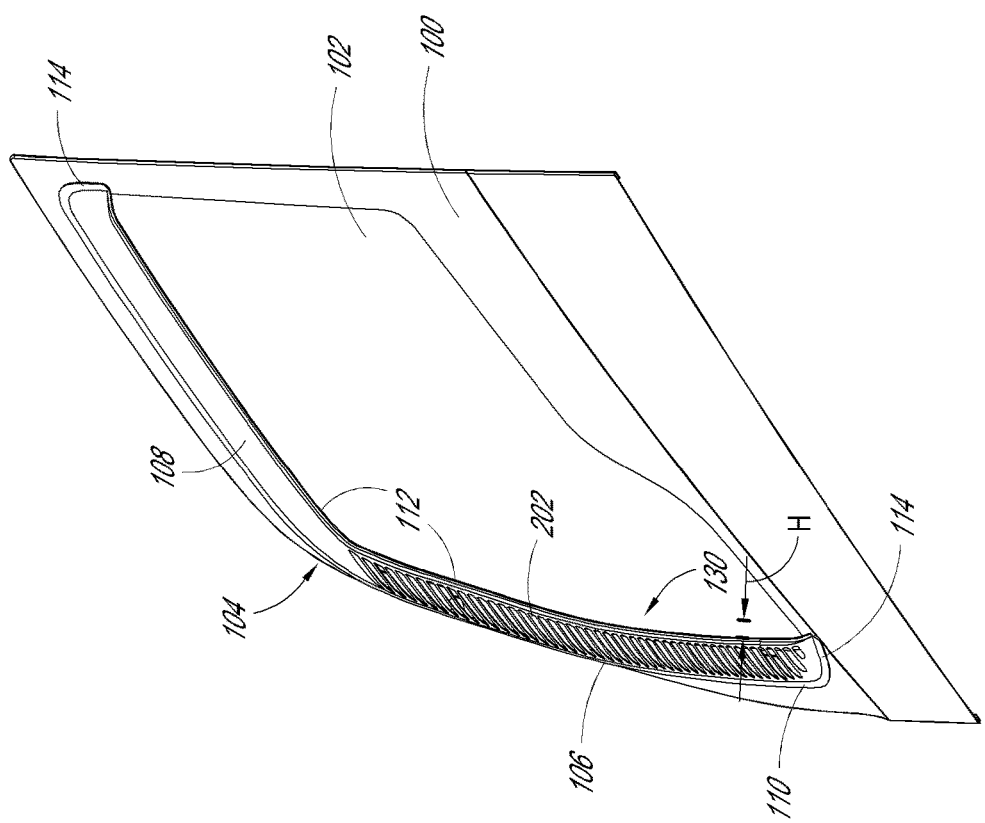
FIG. 2 illustrates an angled view of an embodiment of a window visor on a vehicle door.

In some embodiments, the window visor 104 can have a front lip 110 and a back lip 112. The front lip 110 and back lip 112 can run generally parallel to one another, but there can be variation and they do not need to match. In some embodiments, the front lip 110 and the back lip 112 can be spaced at different distances from the vehicle door 100. For example, the front lip 110 may directly touch the door 100, while the back lip 112 may be approximately 0.1, 0.2, 0.3, 0.4, 0.5, 0.6, 0.7, 0.8, 0.9, or 1.0 inches away from the door 100, as shown as height 117 in FIG. 2. This can form a pocket 130 in the window visor 104. In some embodiments, the back lip 112 may be greater than approximately 0.1, 0.2, 0.3, 0.4, 0.5, 0.6, 0.7, 0.8, 0.9, or 1.0 inches away from the door 100. In some embodiments, the back lip 112 may be less than approximately 0.1, 0.2, 0.3, 0.4, 0.5, 0.6, 0.7, 0.8, 0.9, or 1.0 inches away from the door 100. Accordingly, in embodiments where the front lip 100 and back lip 112 are located at different distances from the door 100, the front lip 110 and the back lips 112 can be connected to one another through outwardly curved connector lips 114.

In some embodiments, the front lip 110 can have a width 111 of approximately 0.1, 0.2, 0.3, 0.4, 0.5, 0.6, 0.7, 0.8, 0.9, or 1.0 inches. In some embodiments, the front lip 110 can have a width 111 of greater than approximately 0.1, 0.2, 0.3, 0.4, 0.5, 0.6, 0.7, 0.8, 0.9, or 1.0 inches. In some embodiments, the front lip 110 can have a width 111 of less than approximately 0.1, 0.2, 0.3, 0.4, 0.5, 0.6, 0.7, 0.8, 0.9, or 1.0 inches.

In some embodiments, the back lip 112 can have a width 113 of approximately 0.1, 0.2, 0.3, 0.4, 0.5, 0.6, 0.7, 0.8, 0.9, or 1.0 inches. In some embodiments, the back lip 112 can have a width 113 of greater than approximately 0.1, 0.2, 0.3, 0.4, 0.5, 0.6, 0.7, 0.8, 0.9, or 1.0 inches. In some embodiments, the back lip 112 can have a width 113 of less than approximately 0.1, 0.2, 0.3, 0.4, 0.5, 0.6, 0.7, 0.8, 0.9, or 1.0 inches.

In some embodiments, the connector lips 114 can have a width 115 of approximately 0.1, 0.2, 0.3, 0.4, 0.5, 0.6, 0.7, 0.8, 0.9, or 1.0 inches. In some embodiments, the connector lips 114 can have a width 115 of greater than approximately 0.1, 0.2, 0.3, 0.4, 0.5, 0.6, 0.7, 0.8, 0.9, or 1.0 inches. In some embodiments, the connector lips 114 can have a width 115 of less than approximately 0.1, 0.2, 0.3, 0.4, 0.5, 0.6, 0.7, 0.8, 0.9, or 1.0 inches.

In some embodiments, the different lips 110/112/114 can all have the same width. In some embodiments, the different lips 110/112/114 can have different widths.

Figure 3A:
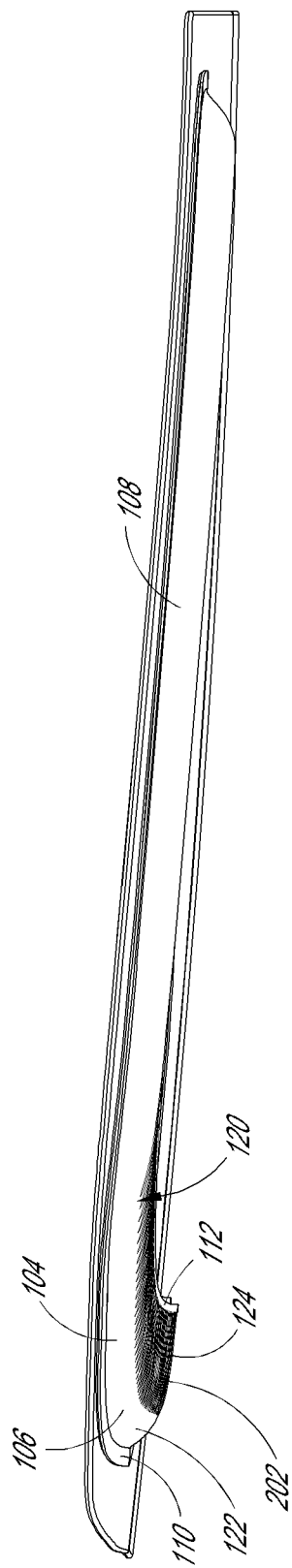
FIG. 3A illustrates a head-on view of an embodiment of a window visor on a vehicle door.
Figure 3C:
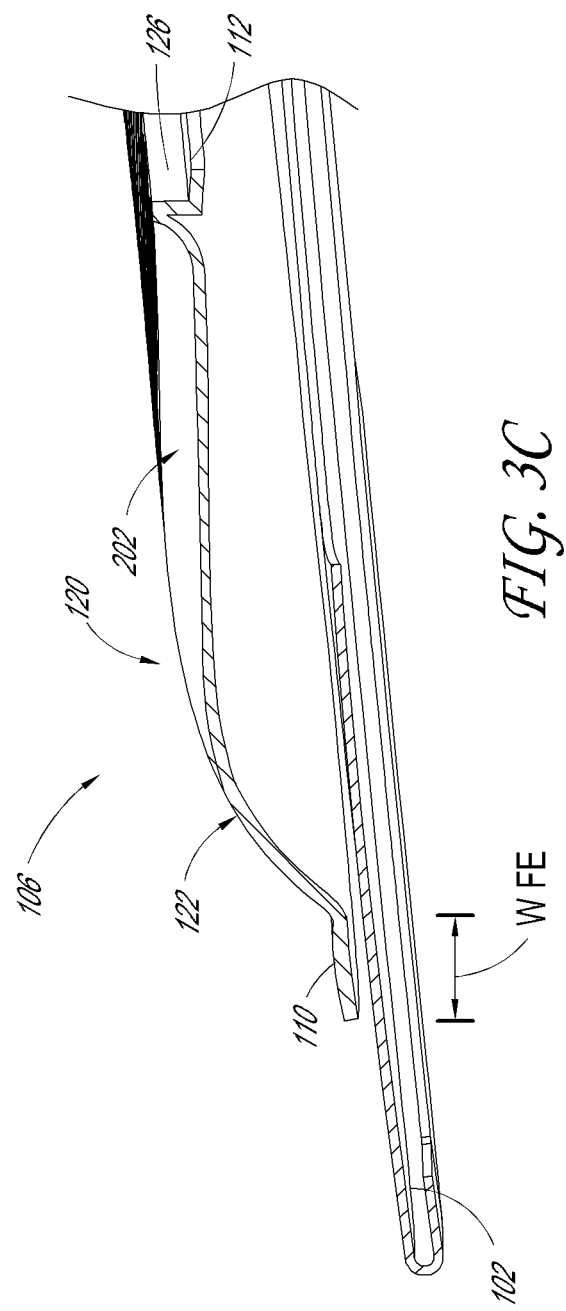
FIG. 3C illustrates a cross-section view of a front leg of an embodiment of a window visor.
Figure 3E:
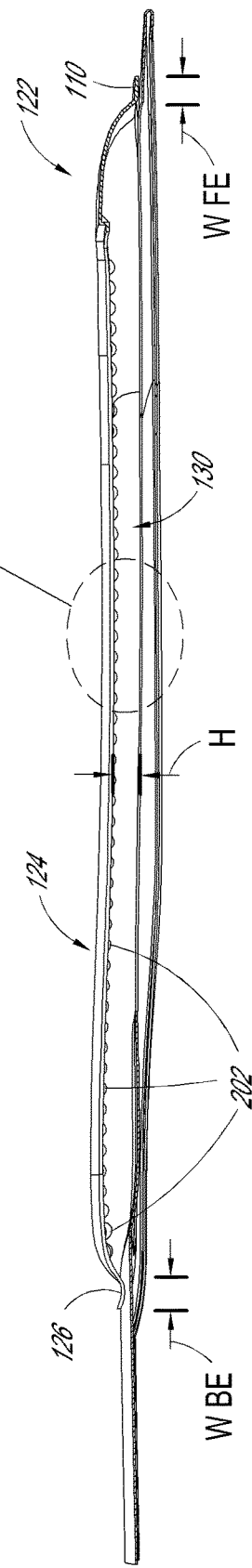
FIG. 3E illustrates a cross-section view of an embodiment of a window visor.
Figure 3F:
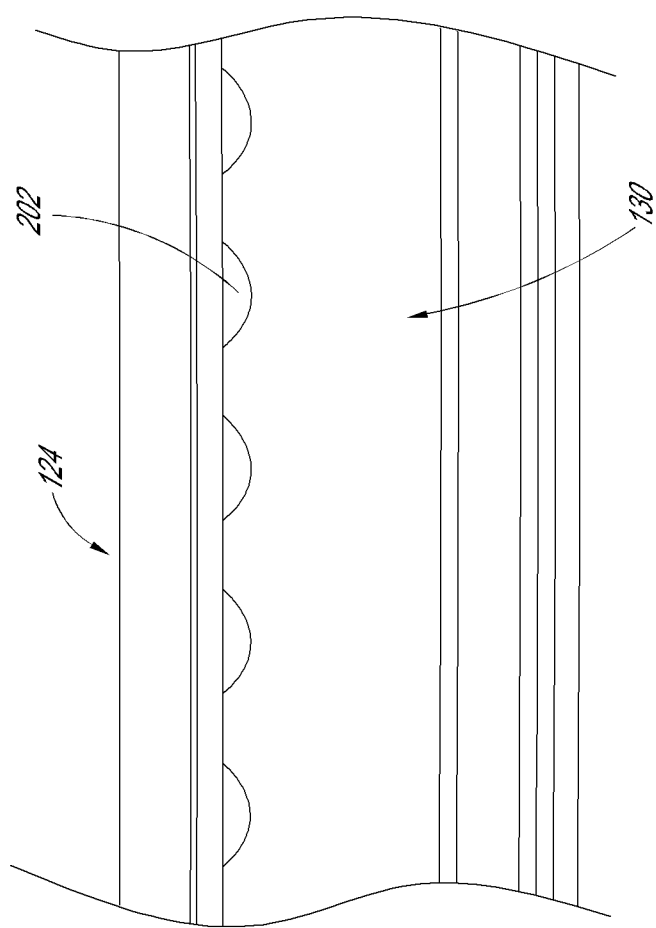
FIG. 3F illustrates a cross-section view of a front leg of an embodiment of a window visor.

As shown in FIG. 1, the front lip 110, back lip 112, and connector lips 114 can surround a body portion 120 of the window visor 102 to form a circumference around the body portion 120. The body portion 120 can be composed of a curved front surface 122 and a generally flat rear surface 124 as shown in FIG. 3A. The front surface 112 can follow along the front lip 110 while the back surface 124 can generally follow along the back lip 112. The front surface 122 can curve outwards and away from the vehicle, thereby leaving a pocket 130 between the rear surface 124 and the vehicle. In some embodiments, the front surface 112 can be generally straight, forming an angled connection between the front surface 122 and rear surface 124. FIGS. 3C and 3D show cross-sectional views of the front leg 106 and top leg 108 of embodiments of the window visor 104, illustrating the described features.

In some embodiments, the front lip 110 can be directly attached to the door 100 of the vehicle. For example, in some embodiments the front lip 110 of the window visor 104 can contain an adhesive, or other non-limiting attachment mechanism, that can be used to connect the window visor 104 to the door 100 so that the window visor 104 covers the upper front lip of the window 102. In some embodiments, the window visor 104 can include a covered strip of adhesive along the inside of the front lip 110 which can be uncovered in order attach the window visor 104 to the door 100. In some embodiments, a separate attachment mechanism can attached to the door 100. The window visor 104 can then attach to the separate attachment mechanism. In some embodiments, attachment of the window visor 104 to the door 100 can be generally permanent. In some embodiments, the window visor 104 can be removably attached to the door 100 to allow for ease of installation and removal of the window visor 104 from the door 100

As the window visor 104 can be attached directly to the door 100 in some embodiments, the window 102 can be opened and closed without affecting the window visor 104. This can advantageously allow a user to vary the temperature in the front of the vehicle through the window 102 without any adverse effects of the window visor 104, such as a visor that is inserted and held in place by a window.

Between the back lip 112 and the back surface 124 is a return surface 126, most clearly shown in FIGS. 3B-D, which extends back towards the window 102. Thus, the back lip 112 is located at a different distance away from the window 102 than the back surface 124. The return surface 126 can be about 0.05, 0.1, 0.15, 0.2, 0.25, 0.3, 0.45, or 0.5 inches. The return surface 126 can be greater than about 0.05, 0.1, 0.15, 0.2, 0.25, 0.3, 0.45, or 0.5 inches. The return surface 126 can be less than about 0.05, 0.1, 0.15, 0.2, 0.25, 0.3, 0.45, or 0.5 inches. The specific distance of the return surface 126 does not limit the disclosure.

Figure 4:
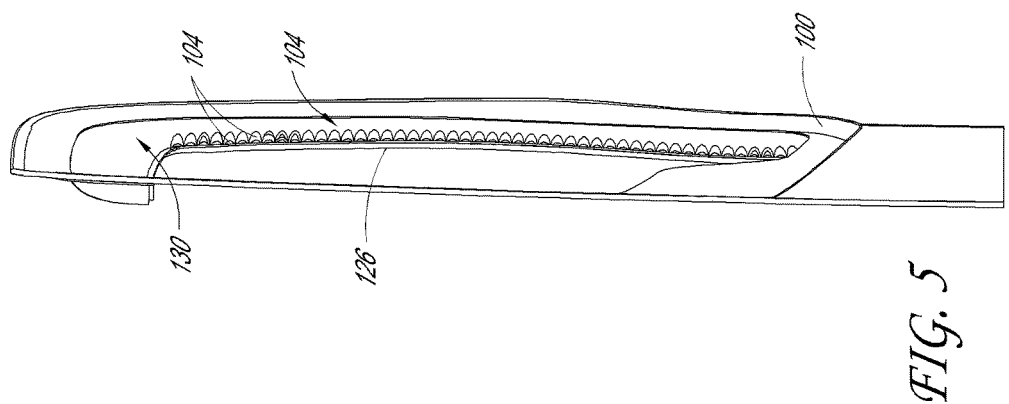
FIG. 4 illustrates a head-on view of an embodiment of a window visor on a vehicle door.
Figure 5:
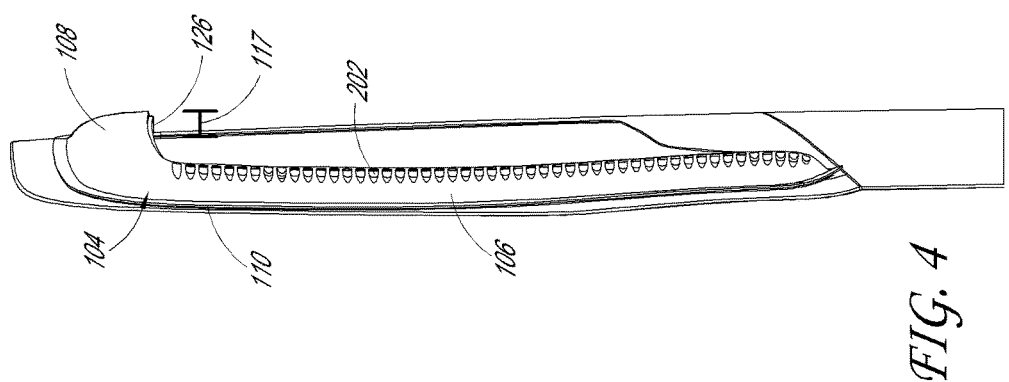
FIG. 5 illustrates a head-on view of an embodiment of a window visor on a vehicle door from the inside of the vehicle.

FIGS. 3-4 illustrate head-on views of embodiments of the window visor 104. As shown in the figures, the window visor 104 protrudes away from the window 104 and vehicle door 100, thus forming the pocket 130. FIG. 5 illustrates an internal viewpoint of the window visor 104 from inside the vehicle, and thus shows the pocket 130.

Figure 6:
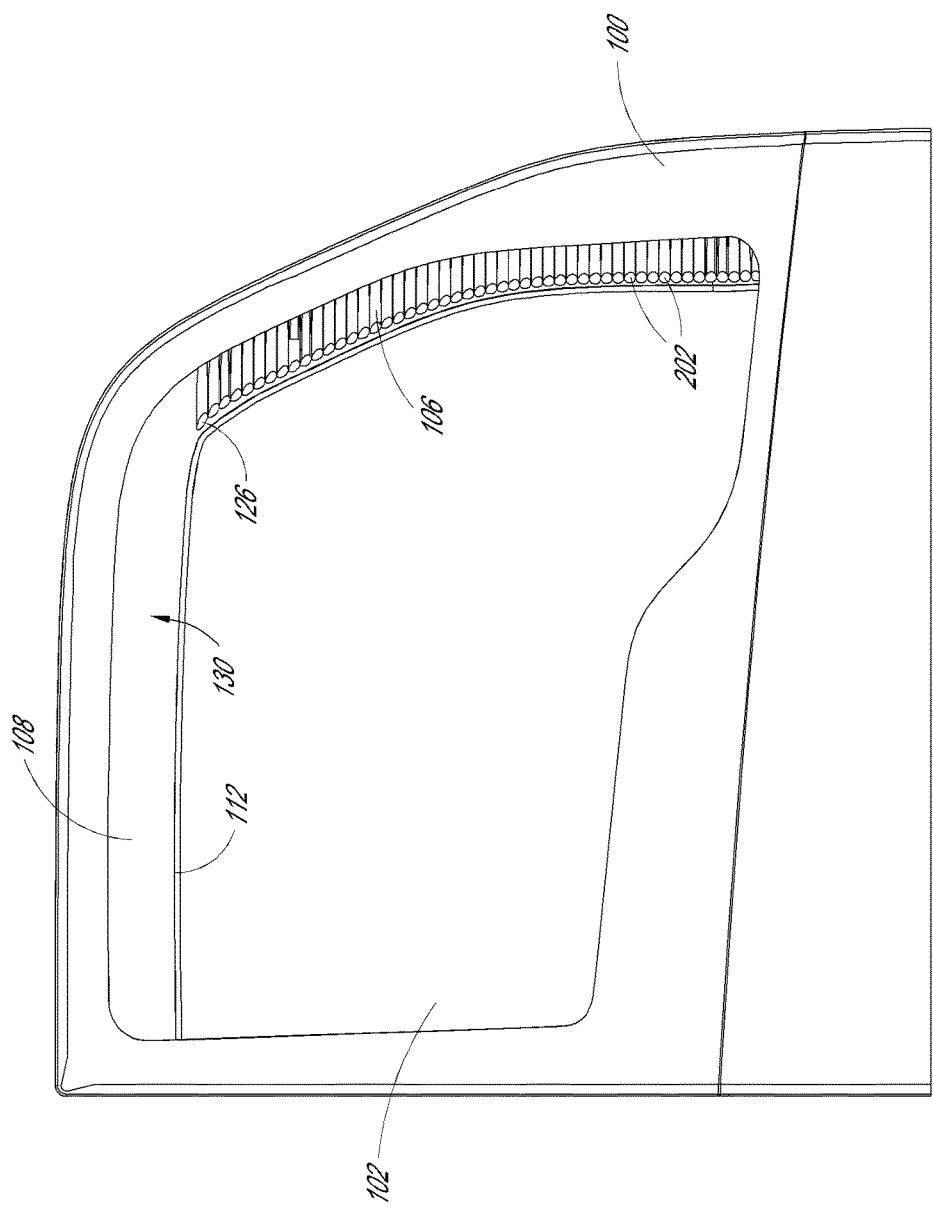
FIG. 6 illustrates a back view of an embodiment of a window visor on a vehicle door from inside the vehicle.

FIG. 6 illustrates a view of an embodiment of a window visor 104 from the inside of the vehicle. As shown, the window visor 104 partially covers both the window 102 and the door 102. Pocket 130 is formed by the structure of the window visor 104 creating a space between the window 102 and the window visor 104. While FIG. 6 shows one position of the window visor 104 on the vehicle door 100, the window visor 104 can be used in other positions as well, and the particular location of the window visor 104 on the door 100 does not limit the disclosure. As discussed above, the window visor 104 can be attached to the door 100 based on a user's preference.

Figure 7:
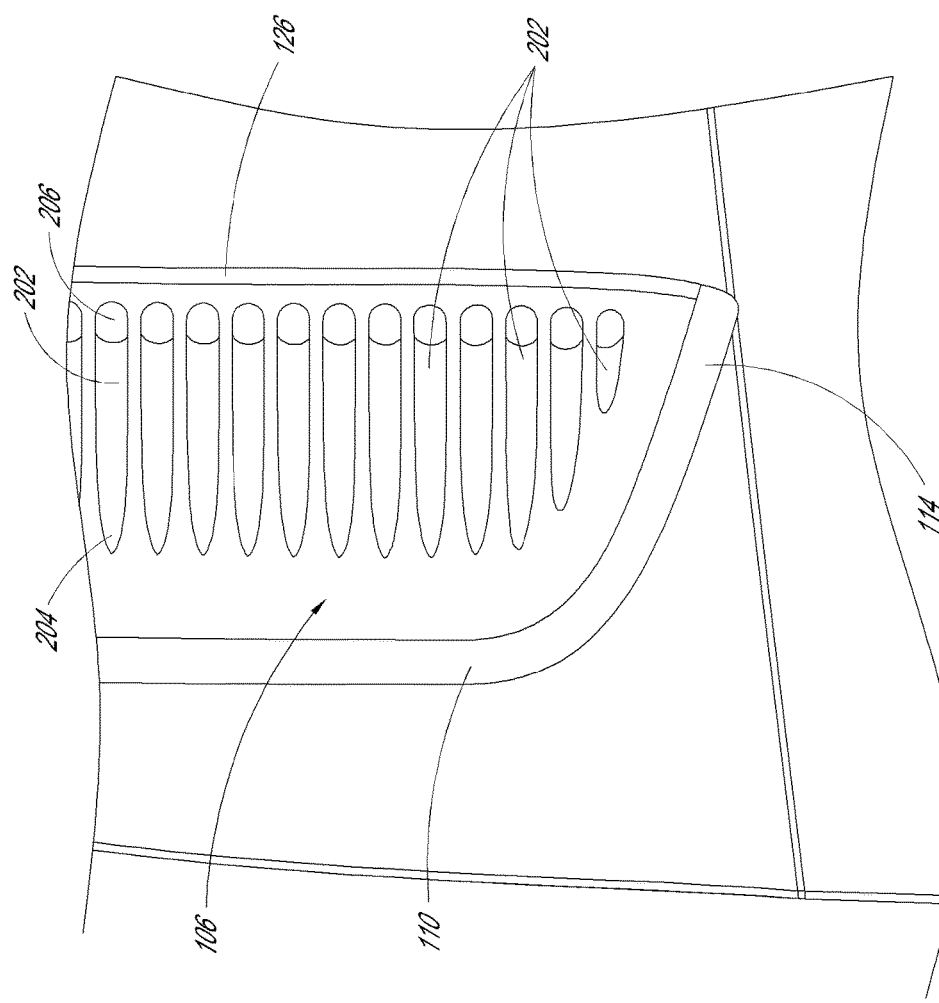
FIG. 7 illustrates grooves in an embodiment of a window visor.

FIG. 7 shows an enlarged in view of the window visor 104, specifically the front leg 106. As shown, in some embodiments the window visor 104 can have a plurality of grooves, channels, furrows, troughs, or indentations 202 located generally on the back surface 124 of the front leg 106. For example, a plurality of grooves 202 can be a narrowing of the window visor 104 in order to form the grooves, which is shown in FIGS. 3B, 3C, 3E, and 3F. In some embodiments, grooves 202 can be formed by the window visor 104 having portions of its frontside (e.g., the surface viewed in FIG. 1) which are recessed with respect to the portions of the frontside surrounding the recessed portions, so as to have their outer surface a decreased distance perpendicular distance from the window 102. In some embodiments, the grooves 202 may protrude from a backside of the window visor 104 towards the window 102, which is shown in FIGS. 6 and 3B/3C. This can be done because, as discussed above, at least a portion of the window visor 104 may extend a distance away from the vehicle. In some embodiments, the grooves 202 do not pass completely through the window visor 104, thus having no opening between the front and back side of the window visor 104.

In some embodiments, 10, 20, 30, 40, 50, 60, or 70 grooves 202 can be used. In some embodiments, less than 10, 20, 30, 40, 50, 60, or 70 grooves 202 can be used. In some embodiments, greater than 10, 20, 30, 40, 50, 60, or 70 grooves 202 can be used. Any number of grooves 202 can be used, and the number of grooves 202 is not limiting.

In some embodiments, the grooves 202 can extend generally parallel with the length of the vehicle. In some embodiments, the grooves 202 can extend generally parallel with the longitudinal axis of the top leg 108. In some embodiments, the grooves 202 can extend at an angle away from a line parallel to the length of the vehicle. In some embodiments, the grooves 202 can extend at an angle of about 1°, 2°, 5°, 10°, 20°, 30°, 40°, or 45° away from a line parallel to the length of the vehicle. In some embodiments, the grooves 202 can extend at an angle of about −1°, −2°, −5°, −10°, −20°, −30°, −40°, or −45° away from a line parallel to the length of the vehicle and/or a longitudinal axis of the top leg 108. In some embodiments, the grooves 202 can extend at an angle of less than about 1°, 2°, 5°, 10°, 20°, 30°, 40°, or 45° away from a line parallel to the length of the vehicle. In some embodiments, the grooves 202 can extend at an angle of less than about −1°, −2°, −5°, −10°, −20°, −30°, −40°, or −45° away from a line parallel to the length of the vehicle. In some embodiments, the grooves 202 can extend at an angle of greater than about 1°, 2°, 5°, 10°, 20°, 30°, 40°, or 45° away from a line parallel to the length of the vehicle. In some embodiments, the grooves 202 can extend at an angle of greater than about −1°, −2°, −5°, −10°, −20°, −30°, −40°, or −45° away from a line parallel to the length of the vehicle.

In some embodiments, the grooves 202 can be located only on the front leg 106. In some embodiments, the grooves 202 can be located only on the back leg 108. In some embodiments, the grooves 202 can be located on the front leg 106 and the back leg 108. In some embodiments, the grooves 202 can cover about 50%, 70%, 90%, 95%, or 99% of the height of the front leg 106. In some embodiments, the grooves 202 can cover greater than about 50%, 70%, 90%, 95%, or 99% of the height of the front leg 106. In some embodiments, the grooves 202 can cover less than about 50%, 70%, 90%, 95%, or 99% of the height of the front leg 106.

In some embodiments, the grooves 202 can have a length of approximately or exactly 0.5, 1, 1.5, 2.0, 2.5, or 3 inches. In some embodiments, the grooves 202 can have a length of greater than approximately or exactly 0.5, 1, 1.5, 2.0, 2.5, or 3 inches. In some embodiments, the grooves 202 can have a length of less than approximately or exactly 0.5, 1, 1.5, 2.0, 2.5, or 3 inches. The particular length of the grooves 202 is not limiting.

In some embodiments, the grooves 202 can have generally the same length throughout. However, the grooves 202 can have different lengths depending on where they are situated on the window visor 104. For example, as shown in FIG. 7, the grooves 202 can be shorter near the bottom of the window visor 104 as there is less room.

In some embodiments, the grooves 202 can be generally straight. In some embodiments, the grooves 202 can be generally or substantially straight in the longitudinal direction. In some embodiments, the grooves 202 can be curved, or can include at least one bend into the grooves 202.

In some embodiments, the grooves 202 can each change in depth as shown in FIGS. 3B-C. For example, the grooves 202 can have a front end 204 towards the front lip 110 of the window visor 104 and a back end 206 towards the back lip 112 of the window visor 104. The grooves 202 can increase in depth from the front end 204 to the back end 206. In some embodiments, the grooves 202 can have a generally square shape. In some embodiments, the grooves 202 can have a generally rounded shape. This can give the grooves 202 a torpedo-shape look as shown in FIG. 7. The particular shape of the grooves 202 does not limit the disclosure. In some embodiments, the back end 206 of the grooves 202 can have a relatively sharp or discontinuous interface between the groove 202 and the return surface 126. Specifically, the angle between a line defined by the average angle formed by the last eighth of an inch of the outer surface of the groove 202 before the groove's back end 206 and the average angle formed by the first eighth of an inch of the outer surface of the return surface 126 (beginning closest to the back end 206 of the groove 202, which in the illustrated embodiment is the distal most end of the return surface to the window) is desirably less than 45 degrees, less than 30 degrees, or less than 15 degrees. This interface may be advantageous for enabling water to slide over the back end 206 of the grooves 202, down the return surface 126, and along the back lip 112.

The grooves 202 can help collect and direct the flow of water away from the window, thus advantageously preventing water buildup on the window. In some embodiments, the window visor 104 can reduce the amount of water on the window as compared to not using the window visor by about 10%, 20%, 30%, 40%, 50%, 60%, 70%, 80%, or 90%. In some embodiments, the window visor 104 can reduce the amount of water on the window as compared to not using the window visor by less than about 10%, 20%, 30%, 40%, 50%, 60%, 70%, 80%, or 90%. In some embodiments, the window visor 104 can reduce the amount of water on the window as compared to not using the window visor by greater than about 10%, 20%, 30%, 40%, 50%, 60%, 70%, 80%, or 90%.

When a vehicle is moving in inclement weather, rain, or other liquid, can land on the front of the vehicle. Windshield wipers are typically used to push rain off the front window, but the wipers can push the rain on to the side of the vehicle, thus collecting on the side windows making it difficult for a user to see out the windows. However, using embodiments of the window visor 104, the amount of water collected on the side windows can be reduced or eliminated.

When water is moving along the side of the vehicle, it can collect in the grooves 202 of the window visor 104. The water can then be directed towards the back end 206 of the grooves 202. The water can then pull off of the grooves 202 and fall into the return surface 126 and back lip 112, which is closer to the vehicle than the grooves 202. As the water has been collected in the grooves 202, once it hits the back lip 112 it can be heavy enough that it falls down the lip 112. The water can then eventually release off from the lip 112, potentially due to the wind or gravity, though a majority of it will be below the level of the window 102. Thus, the rain will not collect on the window 102 as it will be transported below the window. Further, some of the rain will collect and release from the back lip 112 without even coming in contact with the window. Advantageously, this procedure allows for less buildup of rain on the window 102, increasing visibility from a user.

While the above disclosure relates in particular to a window visor that covers the driver's side of a vehicle, it will be understood that a similar visor with generally reversed features could be used on the opposite side of the vehicle. Thus, two window visors could be used at once over each of the windows. Further, the window visor could be incorporated to cover the back windows of larger vehicles, such as 4-door cars and minivans.

From the foregoing description, it will be appreciated that an inventive window visors are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A visor for a window of a vehicle, the visor comprising:
   a front lip configured to be in contact the vehicle, the front lip;
   a back lip configured to be spaced from the vehicle, the back lip being connected to the front lip; and
   a body portion positioned at least partially between the front lip and the back lip, the body portion having a front leg and top leg, the body comprising:
      a plurality of longitudinal grooves extending between the front lip and the back lip; and
      a return surface between the body and the back lip.

2. The visor of claim 1, wherein the front lip has an adhesive strip configured to connect the front lip to the vehicle.

3. The visor of claim 1, wherein the visor has generally an L-shape.

4. The visor of claim 1, wherein there are no grooves on the top leg.

5. The visor of claim 1, wherein the visor does not affect the movement of the window.

6. The visor of claim 1, wherein the plurality of horizontally extending grooves increase in depth from the front lip to the back lip.

7. The visor of claim 1, wherein the plurality of horizontally extending grooves vary in length.

8. A visor system for a window of a vehicle, the visor system comprising:
   a first and second window visor, the first and second window visor being mirror images of one another, each of the first and second window visors comprising:
      a front lip configured to be in contact the vehicle;
      a back lip configured to be spaced away from the vehicle, the back lip being connected to the front lip; and
      a body portion positioned at least partially between the front lip and the back lip, the body portion having a front leg and top leg, the body comprising:
         a plurality of longitudinal grooves extending between the front lip and the back lip; and
         a return surface between the body and the back lip.

9. The visor system of claim 8, wherein the front lip of each window visor has an adhesive strip configured to connect the front lip to the vehicle.

10. The visor system of claim 8, wherein each of the window visors has generally an L-shape.

11. The visor system of claim 8, wherein there are no grooves on the top leg of each of the window visors.

12. The visor system of claim 8, wherein the plurality of horizontally extending grooves increase in depth from the front lip to the back lip of each of the window visors.

13. The visor system of claim 8, wherein the plurality of horizontally extending grooves vary in length for each of the window visors.

14. A window visor for use on a vehicle, the visor comprising:
   a body having a first and second leg, the body surrounded by a perimeter lip, wherein the body curves outwards so that the lip and body lay on different planes, each plane located a different distance from the vehicle;
   a plurality of longitudinal grooves on a surface of one of the legs; and
   a return surface behind the plurality of horizontally extending grooves leading to the back lip.

15. The window visor of claim 14, wherein the perimeter lip has an adhesive strip along at least a portion of the perimeter lip and, the adhesive strip configured to connect the front lip to the vehicle.

16. The window visor of claim 14, wherein the window visor has generally an L-shape.

17. The window visor of claim 14, wherein there are no grooves one of the legs.

18. The window visor of claim 14, wherein the plurality of horizontally extending grooves increase in depth from the front lip to the back lip.

19. The window visor of claim 14, wherein the plurality of horizontally extending grooves vary in length.

* * * * *